Aug. 8, 1950  M. L. JEFFREY  2,518,015
PORTABLE ELECTRIC STOVE

Filed April 28, 1948　　2 Sheets-Sheet 1

INVENTOR.
MAX L. JEFFREY
By
J. D. Douglas

Aug. 8, 1950 M. L. JEFFREY 2,518,015
PORTABLE ELECTRIC STOVE
Filed April 28, 1948 2 Sheets-Sheet 2

INVENTOR.
MAX L. JEFFREY
By
J. D. Douglas

Patented Aug. 8, 1950

2,518,015

UNITED STATES PATENT OFFICE 2,518,015

PORTABLE ELECTRIC STOVE

Max L. Jeffrey, Shaker Heights, Ohio

Application April 28, 1948, Serial No. 23,721

3 Claims. (Cl. 219—19)

This invention relates to electric stoves, and more particularly to a small portable electric stove which is capable of being easily assembled into a small compact package for carrying.

Many small portable electric stoves or hot plates have heretofore been built. Generally, they have been merely heating units in a base designed to heat ordinary sized pans, such as are used in a home kitchen. For travelers, then, this necessitated the carrying not only the stove, but some kind of a pan for use therewith which increased the bulk and was relatively clumsy to handle.

In addition, these stoves were usually provided with open heating element units with considerable danger to the user from electric shock as well as to becoming contaminated in event materials were spilled. These prior devices were so difficult to assemble that they were economically impractical.

By my invention I have eliminated a great many faults of the prior art. The heating element is completely enclosed and is fully insulated. It is also capable of rapid easy assembly which results in economy in its manufacture. Furthermore, the stove is provided with its own pan or food container which fits closely to the top of the heating element for better heat transfer and which is of such size that the heating element and its supporting stand fit snugly into the container providing a small, simple package for storage and carrying.

Still other advantages of my invention will become more apparent from the following description of an embodiment thereof, which description is illustrated by the accompanying drawings and forms a part of this specification.

In general, the stove consists of a container with a cover which may be held in place by any of several means, and a base in which is enclosed the heating element. All necessary electrical connections are made within this base.

Figure 1:
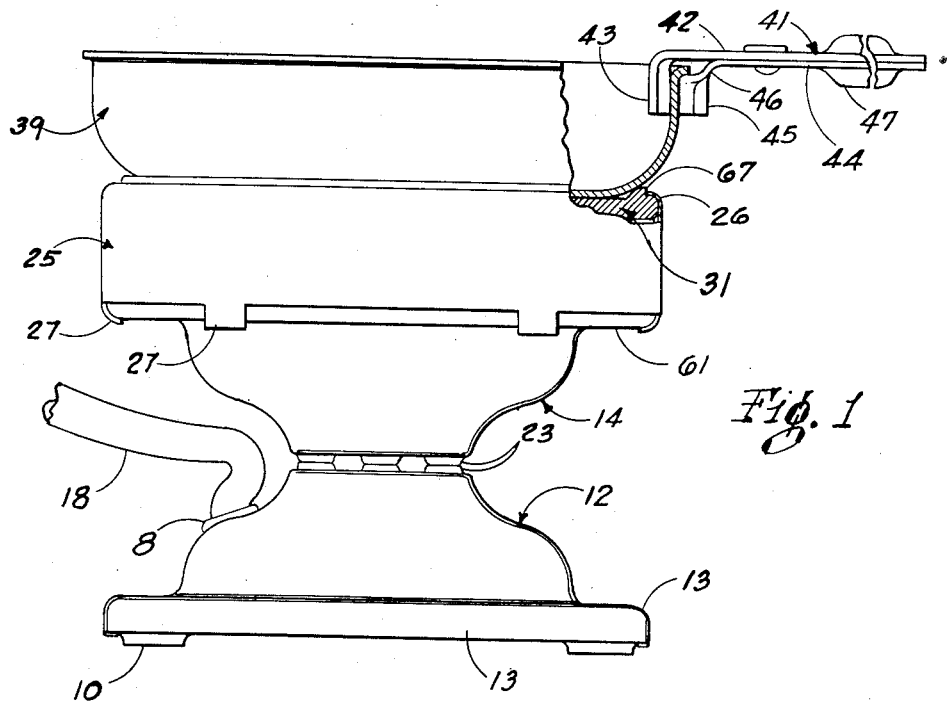
Fig. 1 is an elevational view of the stove showing a pan on top of it and showing a section of the pan and stove broken away to better illustrate the manner in which the pan engages with the stove top and how the handle engages the pan.
Figure 2:
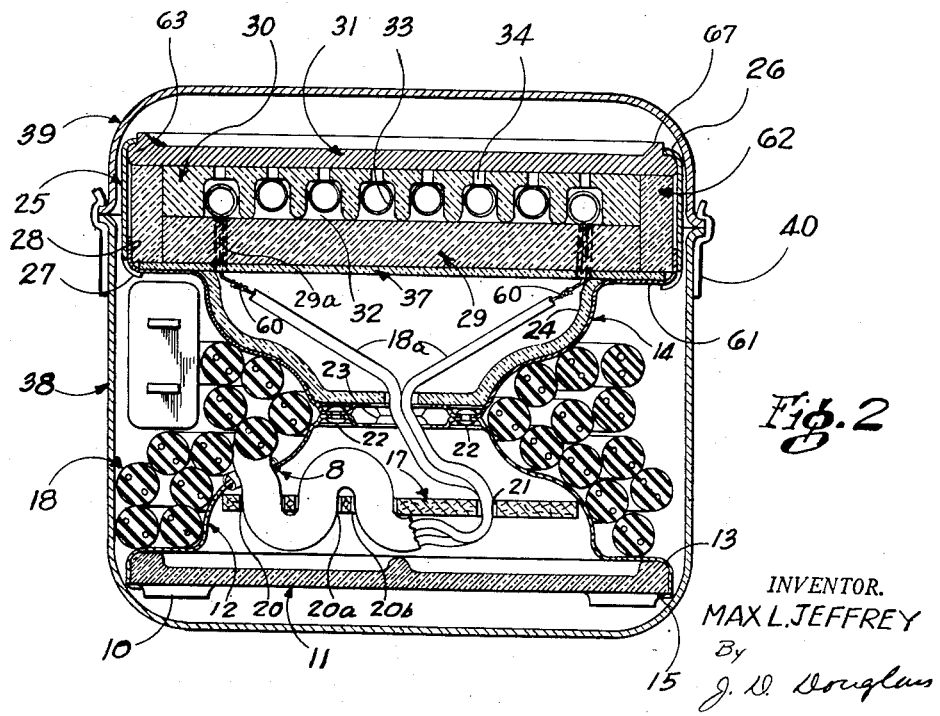
Fig. 2 is a vertical medial section of my stove packed for carrying.
Figure 3:
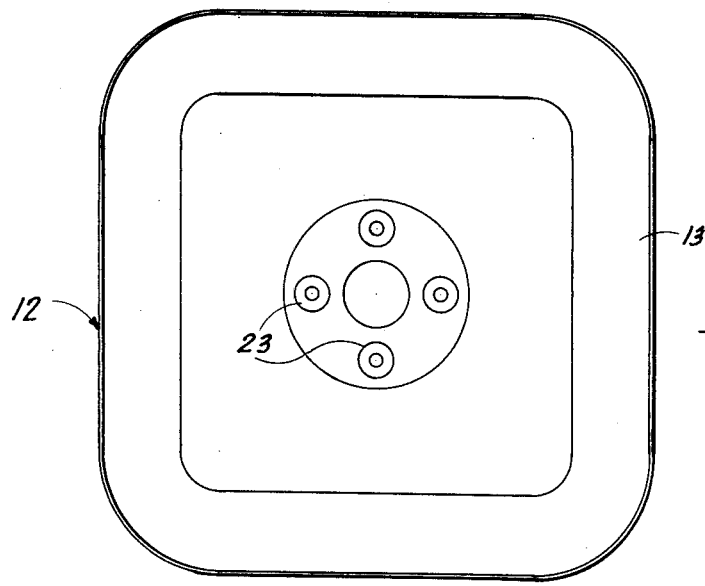
Fig. 3 is a plan view of the base, prior to assembly.
Figure 4:
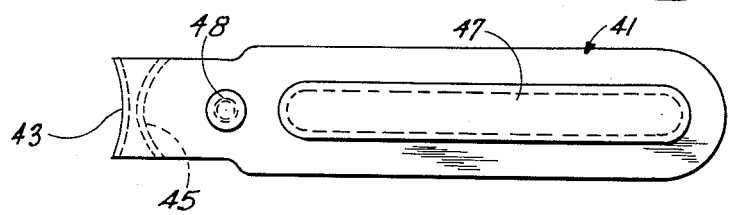
Fig. 4 is a plan view of a handle for use with the pan.

Referring now to the drawings, throughout which like parts are designated by like reference characters, and more particularly to Fig. 1, my stove can be seen to include a lower housing 12 which flares outwardly to provide a base 13 that has secured therein a ceramic table engaging portion 11 having feet 10. Extended upward from the lower housing is an upper housing 14 of similar formation, but inverted, which supports the heating element.

The table engaging piece 11 is attached to the lower housing by having a press fit with the base 13 or by crimping lugs 15 around the edges of the ceramic. A cord lock or strain block 17 is provided in the base, and a cord 18 extends into the housing through a grommet 8 and is then passed downward through a hole 20 in the block 17, then upward through the hole 20a and again downward through the hole 20b. The wires 18a are then brought up, with the outermost shielding having been removed, through the hole 21 and pass upward into the upper housing. This portion of the wire 18a may be insulated by ceramic beading if desired.

The upper housing is secured to the lower housing by means of rivets 22. The heads of these rivets are seated in recesses formed by protruding members, or bosses 23, which are formed in the small ends of the housings. Because these bosses protrude, they also serve to separate the housings over the greater part of their area and thereby provide for maximum insulation of the lower housing against heat transfer from the upper housing. In addition, the inner surface of the upper housing may be lined with a sheet 24 of asbestos or similar fireproof insulating material to provide further insulation.

The heating unit is supported by the upper housing and is held in place by a metal hoop or band 25 which surrounds it. This hoop may be formed with a rolled upper edge 26 and with crimping lugs 27 on the lower edge which may be crimped around the expanded portion of the upper housing to hold the heating assembly in place.

Figure 5:
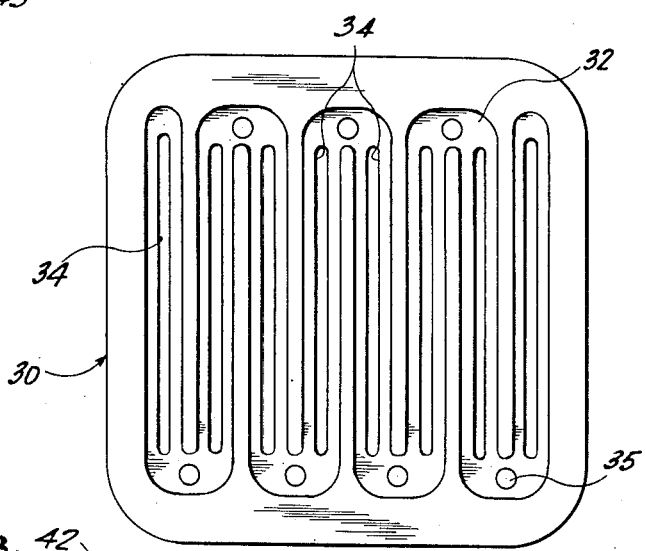
Fig. 5 is a bottom plan view of the heating element supporting ceramic prior to assembly.

The heating unit includes a ceramic heating element supporting member 30, a bottom plan view of which is shown in Fig. 5. As can be seen, it, like its associated parts, is square in plan and is provided with a serpentine groove 32 extending across its surface. This groove receives the coiled heating wire 33 that is laid in the groove. Each leg of the groove is provided with a narrow slot 34 that is disposed in the center of the groove and extends upward through the ceramic. This slot, as will later appear, allows the heat from the heating element to reach the upper plate or the stove top 31 directly. Additional holes 35 may be provided for additional heat transfer ports if desired.

The plate 30 rests upon a ceramic base plate 39, which is a flat plate of rectangular formation, and serves to close the groove 32 and hold the heating wire 33 in place. Openings 29a are provided, through which the ends of the heating element wire extend, being connected at 60 to the wires 18a.

The bottom plate is insulated by a sheet of asbestos insulating material 37, the outer edges of which rest on horizontally extending parts 61 of the upper housing.

Interposed between the upwardly extending flange 28 of the upper housing and the ceramic members 30 and 29 on each of the four edges of the members are ceramic strips 62. These strips rest on the insulation 29 and abut the edges of the ceramic members 30 and 29.

A cap 31 for the assembly is provided, having a flat lower surface for engagement with the member 30, and provided with a bead 63 which extends entirely around its periphery. The entire assembly is held in position by the square hoop or band 25, having the upper inturned lip 26 for engagement with the bead and having lower tongues 27 which are bent into engagement with the part 61 on the housing. The upper face of the plate 31 is provided with a flange 67, the outer edge of which is perpendicular and is engaged by the lip 26 while the inner surface slants inwardly to the flat surface of the plate.

The flange provides means for preventing the cooking pans from slipping off the surface when the device is in use. When not in use, the cord 18 may be wrapped around the base of the stove and the stove may then be inserted into a metal container or pot 38. A cover 39 is provided for this container which may be held thereto by clips 40. In use, this container 38 and cover 39 serve as food containers. The bottom of each is so formed that it is in full contact with the cover plate 31 along almost its entire surface and is so held by the raised edge 67. Thus the container 38 can be used for boiling food or heating liquid food, and the cover 39 can be used for frying or sautéing.

A detachable handle 41 is provided to permit more convenient handling of the pans. This handle comprises two pieces formed of sheet metal, each of which has a handle shaped portion on one end and a pan engaging jaw on the other. The upper part 42 is formed with a straight downward extending jaw 43 which may be curved in order to give it greater rigidity. The lower piece 44 is also formed with a downward extending jaw 45 but this jaw is formed with a step 46 in order to provide clearance between the handle and the rolled edge of the container 38 or cover 39, as can best be seen in Fig. 1. Each of the jaws is curved in a direction away from the pan to provide clearance when the handle is used as hereafter described.

Figure 6:
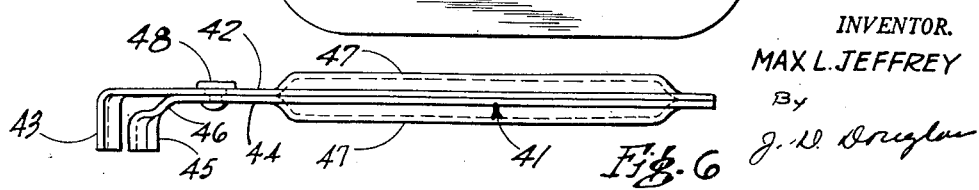
Fig. 6 is an elevational view of the handle.

The two pieces of the handle are fastened together by a rivet 48 in such juxtaposition that the jaws are separated by a space equal to or slightly less than the thickness of the metal which forms the container 38 and the cover 39. In use, the handle portions are separated scissors-wise, thereby opening the space between the jaws. The jaws are then placed over the container 38 (or cover 39) and the handle portions again brought back together, thereby causing the jaws to clamp the container wall, allowing it to be picked up and moved to wherever it is desired. The handle may be formed with raised portions 47 as shown in Fig. 6 to provide for a firmer grip for the hand. The handle is of such size that it too fits within the container when the stove is packed therein for carrying.

It will thus be seen that I have provided an extremely compact stove wherein all the parts are disposed in a small container.

In particular, the heating element is such that it is easily and economically assembled and manufactured. Furthermore, the heating element is protected against foreign materials, while at the same time, the heating is effected indirectly but quickly to the cooking pots.

The structure of the composite ceramic support is such that the expansion and contraction due to heating and cooling does not have a tendency to crack the ceramic. Furthermore with the assembly, should one of the ceramics become cracked, it is still retained in place and will not fall apart. The protection afforded by the upper metal plate, or cooking surface, provides for a more even distribution of heat and is heated more quickly due to the slots in the ceramic. Food or liquid which may fall on the plate can be easily wiped off and does not fall into the heating wires where it can burn and cause undesirable odor. The wire being substantially entirely enclosed cannot accidentally escape.

It will also be noted that there are no screws or bolts used. Thus, economies in manufacture result because no holes need be tapped and no screws need be supplied. The structure when once assembled does not work loose but retains its compact form throughout its useful life because there are no screws to work loose in time.

Having thus described my invention, I am aware that numerous and extensive departures may be made therefrom without departing from the spirit or scope of the invention.

I claim:

1. An electric stove comprising a base in which is contained a heating unit comprising an electric resistive heater element, a flat, insulating, heat resistant base plate and a cover plate of similar material as the base plate, said cover plate having grooves into which said heater element fits and slots narrower than the grooves cut through the plate and above said grooves.

2. An electric stove comprising a base in which is contained a heating unit comprising an electric, resistive heater element; a flat, insulating heat resistant base plate; a cover plate of similar material as said base plate, said cover plate having grooves into which said heater element fits and slots narrower than the grooves cut through the plate and above said grooves, said base being covered by a metal cover plate to provide a heating surface.

3. A heating element for an electric stove or the like comprising a base plate of heat and electrical resistant properties, a second plate disposed on said first plate and being formed with a sinuous groove, a heating element wire disposed in said groove and said top plate being formed with longitudinally extending slots above and opening into said grooves, and means to hold said plates together including a cover for said top plate and a ring engaging the top surface thereof and extending downward around the sides of the plates and extending beneath the lower edges thereof.

MAX L. JEFFREY.

REFERENCES CITED

The following references are of record in the file of this patent:

UNITED STATES PATENTS

| Number | Name | Date |
|---|---|---|
| 1,051,967 | Person | Feb. 4, 1913 |
| 2,055,972 | Fritsche | Sept. 29, 1936 |
| 2,179,934 | Jones | Nov. 14, 1939 |
| 2,226,781 | Rutenber | Dec. 31, 1940 |
| 2,316,222 | Butters | Apr. 13, 1943 |
| 2,448,956 | Christensen | Sept. 7, 1948 |